United States Patent Office 3,473,595
Patented Oct. 21, 1969

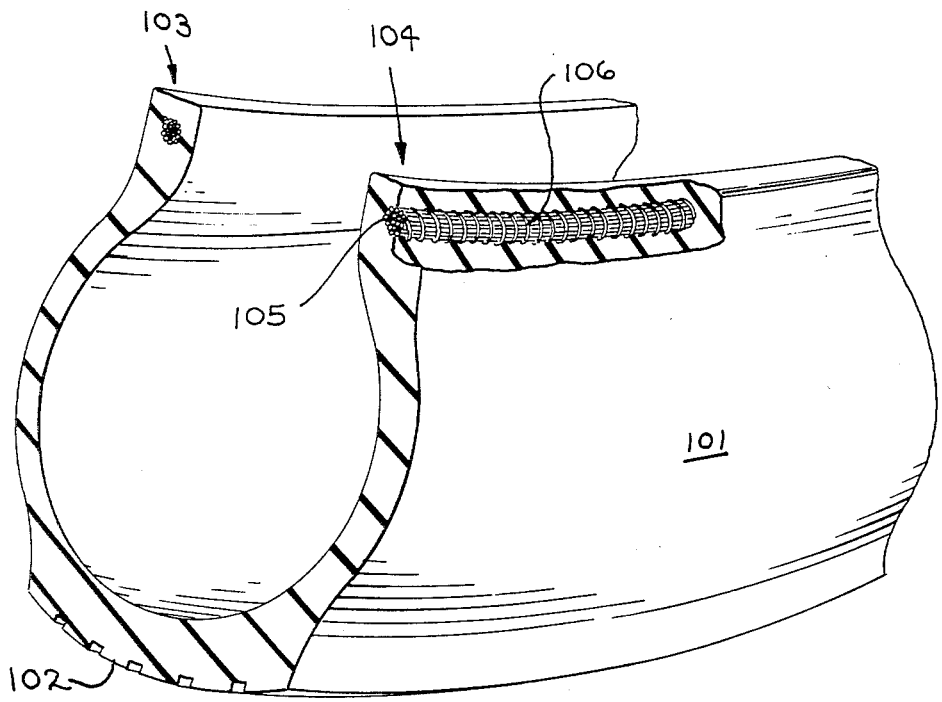

3,473,595
BEAD CONSTRUCTIONS FOR TIRES
Alfred Marzocchi, Cumberland, and Frank J. Lachut, Pawtucket, R.I., assignors to Owens-Corning Fiberglas Corporation, a corporation of Delaware
Application Dec. 27, 1966, Ser. No. 604,944, which is a division of application Ser. No. 452,096, Apr. 30, 1965, now Patent No. 3,311,152, dated Mar. 28, 1967. Divided and this application Jan. 26, 1968, Ser. No. 700,977
Int. Cl. B60c *15/04*
U.S. Cl. 152—361                                    9 Claims

ABSTRACT OF THE DISCLOSURE

An improved bead construction for tires featuring an assembled plurality of bead forming elements encapsulated in a thermosetting resin.

---

This is a division of application Ser. No. 604,944, filed Dec. 27, 1966, now U.S. Patent No. 3,390,714 which is in turn a division of application Ser. No. 452,096, filed Apr. 30, 1965, now U.S. Patent No. 3,311,152.

The present invention relates to tire constructions. More particularly, the present invention relates to a pneumatic tire featuring a novel bead construction.

In conventional tire constructions, of the passenger, truck and off-the-road type, a number of conventional fabrics have been employed as reinforcement components, usually referred to as the carcass. Thus, over the years, cotton, rayon, nylon, polyester ("Dacron"), and even fine high tensile strength steel wire, have been employed in fabricating the carcass plies of tire constructions.

All of these aforementioned organic textiles possess certain individual properties which have made them a desirable reinforcing component, e.g., carcass, etc., for tires. Glass fibers, as such, have also been suggested as a candidate reinforcing component for pneumatic tires. See, for example, Thomas U.S. Pat. No. 2,184,326.

The earliest reinforcing fabric was cotton. Cotton, unfortunately, is subject to moisture degradation and elongation upon exposure to moisture. Rayon, on the other hand, is quite low in modulus and also possesses low strength per unit cross sectional area. Polyamide fibers, e.g., nylon, possess considerably increased strength as compared to rayon, but unfortunately suffers undesirable elongation under load. This is usually attributed to tension stresses developed in the tire under service conditions which, of course, cause heat buildup. This phenomenon also causes the tire casing to increase in size which sets up stresses, causing ultimate cracks to develop in the tread, greatly reducing of the resistance of the tread to wear. "Flat spotting" is also associated with nylon tires and is evident in a thumping which is very obviously noticeable to the driver of the auto on which mounted. All of the candidate organic fibers used to date are possessed of the common problem attributed to elongation in that tires produced by different manufacturers in different facilities are of different overall dimension.

Glass as a reinforcement for rubber possesses a number of properties which are eminently desirable considered in and of themselves. These desirable properties of glass include an essentially 100% elasticity, essentially no yield under stress, excellent dimensional stability and immunity to the changes inherent in varying atmospheric conditions. On the other hand, glass possesses a number of properties which differ considerably from the synthetic or organic materials and therefore presents definite problems of translating the inherently good properties into actual realization. By way of example, glass has a stiffness measured at 322 grams per denier (g.p.d.), whereas polyamides (nylon) range from 18 to 23 g.p.d., polyesters range from 11 to 21 g.p.d., the acrylics such as Acrilan and Orlon range from 7 to 10 g.p.d. and viscose rayon from 11 to 25 g.p.d. Glass also has a very low breaking elongation measuring 3–4%, whereas value for polyesters is 19–30%, the value for nylon is 16–40%, the value for Acrilan is 36–40%, the value for viscose rayon is 9–30%. Also to be considered is the high specific gravity of glass which is 2.54 compared to 1.14 for nylon and the acrylics, 1.5 for rayon and from 1.22 to 1.38 for two typical polyesters; namely, Kodel and Dacron. Additionally, in terms of toughness on a denier basis, glass is quite low with a value of 0.07 compared to nylon's 0.75, rayon's 0.20, Dacron polyesters' 0.5 and acrylic Orlon's value of 0.4.

From the foregoing, it can be concluded that glass possesses advantageous properties as well as disadvantageous properties from the standpoint of successful utilization as a reinforcement for vulcanized rubber products such as tires, belts, hose and the like.

It is an object of the present invention to provide a pneumatic tire employing a novel carcass reinforcement based upon a particular glass fiber assembly or "cord" and a specific arrangement thereof which together combine to yield a tire which is improved in almost every respect as to wear, dimensional stability, general performance characteristics and, particularly, improved mileage.

It is also an object of the present invention to provide a "bias-type" carcass reinforced, pneumatic tire which is eminently most stable in dynamic application than tires known heretofore.

It is also an object of the present invention to provide a novel bead ring construction featuring improved bead integrity and avoidance of distortion of the bead ring components.

The foregoing, as well as other and additional objects of the present invention, will become apparent to those skilled in the art from the following more detailed description taken in conjunction with the annexed sheet of drawing on which there is presented, for purposes of illustration only, a tire construction featuring a bead construction in accordance with the present invention.

In its simplest form, the present invention envisions a pneumatic tire construction composed of spaced beads, a connecting carcass and a ground engaging tread extending peripherally about the crown portion of the carcass, in which the beads comprise an assembled plurality of substantially contiguous bead forming elements; said assembly being encapsulated in a thermosetting resin.

Tire reinforcement is a term usually employed to include carcass plies, belt plies or breaker strips, and bead members. The present invention is particularly concerned with the latter. Bead construction in a tire is important due to the fact that it is the bead which provides the engagement with the rim.

In the drawing:

The drawing is a perspective view of a section of a tire embodying a bead construction in accordance with the present invention.

As used here, a "filament" of glass is meant to define an individual fiber of glass. A "strand," on the other hand, is a collection of a great plurality of individual "filaments." A strand may include 104 filaments, 208 filaments, and even up to 500–2000 individual filaments gathered together in a manner well known in the art and technology of glass fiber manufacture. A "cord" or "bundle" is made up of a plurality of strands, e.g., ranging from 2 to 30 and even up to 50 strands, plied or assembled together continuously. Strands may possess a twist, reverse twist, or no twist at all. Several different assemblies of strands may be combined to yield an ultimate "cord" having a total number of strands equal to the number of strands in the first assembly and the number of these assemblies combined to make up the final cord. Thus, a cord may be composed of a large number of individual filaments ranging in number from 200–30,000. By way of illustration, a cord construction may feature 10 strands of continuous filaments gathered together with or without twist. Additionally, 3 of the just foregoing mentioned 10-ply strand assemblies may be joined together with or without twist to form a 30-strand assembly; each strand being composed, for example, of 100–200 filaments yielding a 3000–6000 filament cord or bundle assembly. The latter is frequently designated a "10/3" cord. A "10/5/3" cord is an assembly of three 10/5 yarns; the latter including five 10-strand yarn assemblies. The latter thus includes [10×5×3]×200 filaments, e.g., 30,000.

Table 1 hereinbelow lists the properties possessed by a single glass fiber or filament.

TABLE 1.—GLASS FIBER SINGLE FILAMENT PROPERTIES

| | |
|---|---|
| Tensile strength _____ p.s.i__ | 500,000 |
| Tenacity _____ g.p.d__ | 15.3 |
| Ultimate elongation _____ percent__ | 4.8 |
| Elastic recovery _____ do____ | 100 |
| Toughness _____ p.s.i__ | 11,900 |
| Modulus _____ p.s.i__ | 10,500,000 |
| Coefficient of thermal expansion _____ | $2.8 \times 10^{-6}$ |
| Water adsorbency _____ percent__ | 0.3 |
| Moisture regain _____ do____ | 0.0 |

In order that the glass fibers can most effectively contribute reinforcing action to the tire, it is desirable that the glass fibers be first treated or sized, as it were, to provide a protection against interfilament destructive action. The latter is overcome preferably by a combination of treatments to provide a protective coating as well as a bonding and anchoring agent on the surface which will enhance the bonding between the glass fiber surface and the elastomeric material. This is usually accomplished by a combination of sprayed-on liquid size treatments just after the glass filament is formed and a subsequent impregnation of the strands or cords as they are formed, usually simply by introducing the gathered filaments into a pool of the treating liquid while simultaneously distorting the strand filaments to effect penetration into the zones between fibers, thereby insuring complete impregnation. Following impregnation, the coated strands or cords are given a mild heat treatment to set the treating agent. A sysem of treatment for glass fibers may involve a first surface treatment embodying an anchoring agent which enhances the bonding relationship between the glass fiber surface and the ultimately used elastomeric material. A suitable anchoring agent is represented by the amino silanes such as gamma-aminopropyltriethoxy silane or by a similar silane having a carboxyl group in the orgnic group attached to the silicon atom or an amino or carboxyl group in the carboxylato group of a Werner complex compound. These may be applied to the glass fiber surfaces or incorporated as a component of a size composition and applied to the glass fibers as they are gathered together in the formation of strands, yarns or the like; all of which is more fully described in the co-pending application Ser. No. 406,501, filed Oct. 26, 1964, now U.S. Patent No. 3,391,052, entitled "Glass Fibers Treated for Combination with Elastomeric Materials and Method." A desired strong bonding relationship can also be achieved by the impregnation of the strands or other multi-filament glass fiber structure with a composition formulated to contain, in addition, an elastomeric material, preferably in an uncured or an unvulcanized state as described in the aforesaid copending application Ser. No. 406,501, as will hereinafter be illustrated by way of examples.

For purposes of comparison, the following table lists the reinforcement cord properties comparing glass "cords" with organic cords.

TABLE 2.—REINFORCEMENT CORD PROPERTIES GLASS FIBERS VERSUS ORGANIC CORDS

| | Glass fibers | Rayon | Nylon | Polyester |
|---|---|---|---|---|
| Strength, p.s.i | 407,000 | 94,000 | 122,000 | 104,000 |
| Toughness, p.s.i | 9,900 | 5,800 | 10,200 | 9,900 |
| Impact resistance, ft. lbs. × $10^{-4}$/denier | 3.95 | 1.87 | 4.08 | 3.41 |
| Modulus, p.s.i. × $10^{-6}$ | 8.45 | 0.96 | 0.63 | 0.57 |
| Elongation, percent | 4.8 | 9.8 | 19.3 | 18.5 |

The properties appearing in the foregoing Table 2 speak generally for themselves.

The following are representative of size compositions which may be applied to the glass fibers in forming.

Example I

Percent by weight
Gamma-aminopropyltriethoxy silane _____ 0.5–2.0
Glycerine _____ 0.3–0.6
Remainder water.

Example II

Percent by weight
Partially dextrinized starch _____ 8.0
Hydrogenated vegetable oil _____ 1.8
Lauryl amine acetate (wetting agent) _____ 0.4
Non-ionic emulsifying agent _____ 0.2
Glycylato chromic chloride _____ 1.0

Example III

Percent by weight
Saturated polyester resin _____ 3.2
Polargonate amide solubilized with acetic acid ____ 0.1
Tetraethylene pentamine stearic acid _____ 0.1
Polyvinyl alcohol _____ 0.1
Polyvinyl pyrrolidone _____ 3.0
Gamma-aminopropyltriethoxy silane _____ 0.3
Acetic acid _____ 0.1
Water _____ 93.1

The size composition is merely applied to the glass fiber filaments as they are gathered together and the strand of sized glass fibers is allowed to dry in ambient air.

In the foregoing examples, the gamma-aminopropyltriethoxy silane can be replaced as an anchoring agent with other amino silanes such as gamma-aminopropylvinyldiethoxy silane, n(gamma-triethoxysilylpropyl)propylamine, beta-aminoallyltriethoxy silane, aniline silane derivatives, etc.

While it is not essential to impregnate the strand or bundle of glass fibers, it is preferred to impregnate the bundle of glass fibers for fuller separation of the fibers one from the other in the bundle and to incorporate an elastomeric system into the interior of the glass fiber bundle whereby the fibers can more effectively become anchored in the elastomeric system.

For this purpose, the strand or yarn of glass fibers is simply unwound from a supply drum and advanced submergedly into a bath of the elastomeric impregnant. Thence, the impregnated yarn is pulled through a wiping die which works the impregnating liquid into the innermost regions of the bundle or strand and also serves to wipe off excess material.

The following are a few representative liquid compositions containing an elastomeric material which may be used to impregnate the bundle or strand of glass fibers.

Example IV

Parts by weight
Neoprene rubber _____ 100
Powdered magnesium oxide _____ 4
Powdered zinc oxide _____ 5
Channel black _____ 15
Thiate B (trialkyl thiourea accelerator) _____ 1

The foregoing ingredients after being mixed on a mill are combined with sufficient of a suitable rubber solvent to form a liquid impregnant bath.

Example V

| | Parts by weight |
|---|---|
| Paracril C rubber (Buna N) | 100 |
| SRF carbon black | 25 |
| Powdered zinc oxide | 5 |
| Aminox (reaction product of diphenyl amine ester) | 0.5 |
| Stearic acid | 1 |
| Dicumyl peroxide | 40 |

The foregoing ingredients after being mixed on a mill are combined with sufficient of a suitable rubber solvent to form a liquid impregnant bath.

Example VI

| | Parts by weight |
|---|---|
| Lotol 5440 [1] (U.S. Rubber Company) | 60 |
| Water | 39 |

[1] Lotol 5440 is a 38% dispersed solids system including a butadiene-styrene-vinyl pyridine terpolymer latex, a butadiene styrene latex and a resorcinol-formaldehyde resin.

Impregnation of the glass cords (assembly of strands) is usually accomplished by passing a continuous length of cord down into a pool of the impregnant solution or liquid (Examples IV–VI hereinabove list suitable impregnant formulations) under conditions which tend to promote complete penetration of the impregnant liquid into the interstices or voids, as it were, between filaments of glass making up the strand and the cord. This may be done, for example, by causing the cord to pass about a peg while submerged, causing some distortion of the filaments tending to eliminate air from these interstitial voids and entrance of the liquid impregnant thoroughly about the individual fibers. A wiping die through which the cord is passed after emerging from the impregnant bath also aids in thorough impregnation. Thereafter, the cord is passed through a mild hot air oven sufficient to dry the impregnant to a handleable non-tacky state. Care is taken in drying that curing is avoided.

Referring now to the drawings and specifically FIG. 1, there is disclosed a tire 101 having beads 103 and 104 in spaced relationship and connected by a toroidal carcass carrying a tread 102 at the crown thereof. The carcass is not shown in detail since such subject matter is treated fully in our parent applications Ser. No. 604,944 and Ser. No. 452,096 (now U.S. Patent No. 3,311,152) referred to earlier herein.

The bead members include a bundle of bead wires 105. To reduce the tendency of the individual wires to become separated, the rubber stock in the region surrounding the bead wires is stiffened or toughened to reduce the flow characteristics by including a phenolic resin, a resorcinol formaldehyde latex or an epoxide coating. In place of the wires, we can use cords of glass as described earlier herein; care being taken to include an impregnant precluding fiber contact with adjacent fibers. Alternatively or additively, the bead elements are reinforced by a spiral wrap member 106 which is wound about the bead wire assembly. The wrap is preferably, in accordance with the present invention, composed of a cord of glass fiber strand assemblies impregnated in a manner described hereinbefore. The wrap cord of glass fiber strands can be further encapsulated, as it were, in a thermosetting resin such as an epoxy resin, a phenolic resin or a resorcinol formaldehyde latex composition.

It will be appreciated that variations in constructional features, as well as substitution of equivalent components, may be undertaken without departing from the spirit and scope of the present invention.

We claim:

1. A pneumatic tire construction including spaced bead members of annular configuration, a toroidal carcass extending from bead to bead and a ground contacting tread attached to the crown portion of said carcass, said bead members each comprising an assembled plurality of strands formed of a gathered-together plurality of glass filaments, said beads each defining an annulus, each of said annular beads including a surrounding reinforcement comprising a spiral wrap of a cord composed of a plurality of strands formed of a gathered-together plurality of glass filaments.

2. The construction as claimed in claim 1, wherein said glass cord beads are each embedded in a thermosetting resinous material.

3. The tire construction as claimed in claim 2, wherein said resinous material is an epoxide.

4. In a pneumatic tire construction which includes spaced bead members of annular configuration, a toroidal carcass extending from bead to bead and a ground contacting tread attached to the crown portion of said carcass, the improvement wherein said beads each comprise an assembled plurality of contiguous bead forming elements, said assembly being encapsulated in an epoxy resin.

5. The tire construction as claimed in claim 4, wherein said bead forming elements are glass cords formed of assembled strands.

6. The tire construction as claimed in claim 5, wherein said plurality of glass cords are each impregnated with an elastomeric substance.

7. The tire construction as claimed in claim 6, wherein said elastomeric substance includes a butadiene-styrene-vinyl pyridine terpolymer, a butadiene-styrene latex and a resorcinol formaldehyde resin.

8. The tire construction as claimed in claim 5, wherein said resin is a phenolic resin.

9. The tire construction as claimed in claim 5, wherein said resin is a resorcinol formaldehyde resin.

References Cited

UNITED STATES PATENTS

| 2,224,274 | 12/1940 | Powers | 152—362 |
| 2,827,099 | 3/1958 | Youngs | 152—359 |
| 2,884,041 | 4/1958 | Mullen | 152—362 |
| 3,106,952 | 10/1963 | Rudder | 152—362 |
| 3,282,724 | 11/1966 | Atwell | 152—362 |
| 2,983,299 | 5/1961 | Jenkins | 152—362 |

ARTHUR L. LA POINT, Primary Examiner